US011281700B2

(12) United States Patent
Aylett et al.

(10) Patent No.: US 11,281,700 B2
(45) Date of Patent: Mar. 22, 2022

(54) GRAPH-BASED OPERATIONS ON AN ENTITY-RELATIONSHIP DATABASE

(71) Applicant: Global Software Innovation Pty Ltd, Baulkham Hills (AU)

(72) Inventors: Peter Kyra Aylett, North Ryde (AU); David Gregory Quint, Kariong (AU); Darren Jacobs, West Pennant Hills (AU); Nino Carabella, Preston (AU); Anurag Sharma, Baulkham Hills (AU); Diana Sandra Walker, Glenbrook (AU); Scott Hopwood, West Pymble (AU)

(73) Assignee: GLOBAL SOFTWARE INNOVATION PTY LTD, Baulkham Hills (AU)

( * ) Notice: Subject to any disclaimer, the term of this patent is extended or adjusted under 35 U.S.C. 154(b) by 245 days.

(21) Appl. No.: 16/074,386

(22) PCT Filed: Jan. 31, 2017

(86) PCT No.: PCT/AU2017/000031
§ 371 (c)(1),
(2) Date: Jul. 31, 2018

(87) PCT Pub. No.: WO2017/132717
PCT Pub. Date: Aug. 10, 2017

(65) Prior Publication Data
US 2019/0042641 A1 Feb. 7, 2019

(30) Foreign Application Priority Data

Feb. 1, 2016 (AU) .............................. 2016900307

(51) Int. Cl.
*G06F 16/21* (2019.01)
*G06F 16/28* (2019.01)
(Continued)

(52) U.S. Cl.
CPC ............ *G06F 16/288* (2019.01); *G06F 16/00* (2019.01); *G06F 16/21* (2019.01); *G06F 16/22* (2019.01); *G06F 16/285* (2019.01)

(58) Field of Classification Search
CPC .......... G06F 16/28; G06F 16/00; G06F 16/21; G06F 16/22
See application file for complete search history.

(56) References Cited

U.S. PATENT DOCUMENTS 6,633,869 B1 * 10/2003 Duparcmeur ....... G06F 16/2365
6,738,077 B1 *  5/2004 Wendker ............... G06F 16/252
                                                              715/744

(Continued)

OTHER PUBLICATIONS

Truong, P., "Prevent Circular References in Database Design," The Code Project, Aug. 2, 2009, <https://web.archive.org/web/20120319214851/https://www.codeproject.com/Articles/38655/Prevent-Circular-References-in-Database-Design>, retrieved on Dec. 7, 2017, 8 pages.

*Primary Examiner* — Aleksandr Kerzhner
*Assistant Examiner* — Maher N Algibhah
(74) *Attorney, Agent, or Firm* — Slater Matsil, LLP

(57) ABSTRACT

A method and apparatus for performing actions of a graph-based activity on a subset of an entity-relationship database, wherein the database has entity instances related by relationship instances. Each relationship instance is associated with a relationship type. Each relationship type has associated metadata. Method steps include identifying an entity instance in the entity-relationship database upon which the action is to be performed, performing the action, determining one or more entity instances related to the identified entity instance, and for each determined entity instance, determining the relationship type of the relationship instance relating the determined entity instance to the identified entity instance, and determining, based upon the metadata associ- (Continued)

ated with the relationship type, whether the action is to be performed on the determined entity instance, and repeating the method steps for each entity instance for which it is determined that the action is to be performed on that instance.

12 Claims, 13 Drawing Sheets

(51) Int. Cl.
    *G06F 16/22*    (2019.01)
    *G06F 16/00*    (2019.01)

(56) References Cited

U.S. PATENT DOCUMENTS

| | | | |
|---|---|---|---|
| 7,143,108 B1* | 11/2006 | George | G06F 16/284 |
| 8,122,061 B1* | 2/2012 | Guinness | G06F 16/211 |
| | | | 707/802 |
| 8,645,331 B2 | 2/2014 | Blaicher et al. | |
| 10,505,825 B1* | 12/2019 | Bettaiah | H04L 43/04 |
| 10,936,740 B2* | 3/2021 | Aylett | G06F 21/6218 |
| 2003/0051066 A1* | 3/2003 | Pace | G06F 8/65 |
| | | | 719/316 |
| 2003/0229610 A1 | 12/2003 | Van Treeck | |
| 2004/0036716 A1* | 2/2004 | Jordahl | G06F 16/24578 |
| | | | 715/713 |
| 2005/0108262 A1* | 5/2005 | Fawcett, Jr. | G06Q 30/0282 |
| 2006/0095466 A1 | 5/2006 | Stevens et al. | |
| 2007/0038641 A1* | 2/2007 | Fawcett | G06F 16/957 |
| 2008/0288462 A1* | 11/2008 | Naono | G06F 16/288 |
| 2009/0024656 A1 | 1/2009 | Wellman | |
| 2009/0055418 A1* | 2/2009 | Megerian | G06F 16/24565 |
| 2009/0327262 A1* | 12/2009 | Grack | G06F 16/93 |
| 2010/0100533 A1* | 4/2010 | Blaicher | G06F 11/0727 |
| | | | 707/696 |
| 2010/0287208 A1* | 11/2010 | Mao | G06F 16/288 |
| | | | 707/803 |
| 2012/0054140 A1* | 3/2012 | Shimizu | G06N 5/02 |
| | | | 706/46 |
| 2015/0074155 A1* | 3/2015 | Walter | G06F 16/00 |
| | | | 707/816 |
| 2017/0235769 A1* | 8/2017 | Livshits | G06F 16/285 |
| | | | 707/803 |
| 2019/0370231 A1* | 12/2019 | Riggs | G06F 16/248 |

* cited by examiner

GRAPH-BASED OPERATIONS ON AN ENTITY-RELATIONSHIP DATABASE

CROSS-REFERENCE TO RELATED APPLICATIONS

This patent application is a national phase filing under section 371 of PCT/AU2017/000031, filed Jan. 31, 2017, which claims the priority of Australian patent application 2016900307, filed Feb. 1, 2016, each of which is incorporated herein by reference in its entirety.

TECHNICAL FIELD

The present invention relates generally to entities stored in an entity-relationship database and, in particular, to performing various operations on entities stored within the database while maintaining appropriate relationships.

BACKGROUND

An application or system often consists of multiple discrete components. Tabular reports and strategy are two examples of such discrete components. Each component in turn consists of multiple sub-components. For example, a report consists of sub-components including columns, formatting data, filtering and sorting rules. The structure and nature of each particular report need to be stored within the system. This structure and nature may apply both to application internal data, as well as end user data.

Examples of complex components composed of sub-components may include reports, user interface screens, workflows, calculation mechanisms, charts and graphics, analysis rules, schema metadata, layout configurations, security configurations, execution strategies, document templates, to name a few.

A common and expected activity is to be able to delete a component, for example delete a report or strategy. The end user would not expect to be required to manually locate and delete all of the individual sub-components of some composite component such as a report. Ordinarily there would be a mechanism devoted to the task of locating the interrelated sub-components of a report and then removing them. However the mechanism devoted to removing a report may not be readily suitable to deleting some different type of component, such as a strategy. It would be desirable to have a general purpose mechanism for correctly and safely deleting components, and deleting all interconnected pieces, without regard to the type of component.

Another common activity is to make a copy of a component, such as a report. Again, all of the interconnected pieces need to be copied that are within the bounds of the report. However, the mechanism copying the component must be smart enough to not make copies of external pieces that lie outside the bounds of the report. Similarly, the mechanism that are suitable for performing this complex activity on one type of component is unlikely to be suitable for making a copy of another type of component, and it would again be desirable to generalize the mechanism, so that the time and effort of creating and maintaining each is not duplicated.

It is desirable to be able to group components into packages for the purpose presenting the grouped components as a single unit, possibly to be made available as an individual application or an extension plug-in. The mechanism to do so needs to know how to export and import the relevant sub-components of nominated components into the package. These packages may also need to be upgradeable.

In both cases, it is desirable to have a general purpose mechanism, rather than having to create machine instructions on a case-by-case basis for each type of component.

The common problem being addressed is that a complex system consists of many types of components. These components consist of interconnected sub-components. Many forms of interaction with components present common themes across different types of components. Typical solutions involve an implementation based on each component type. More general solutions that work across component types would require less effort to maintain, and less effort to extend to additional component types.

These generalized activities are not restricted to the domain of application components and structure, but they extend to business data as well. For example, invoices, CRM activities, disaster recovery plans, financial plans, manifests, contracts, meeting requests, communication records, customer records, and many other types of various business data has structure that often consists of multiple sub-components, and there is similarly a need to perform common operations across them.

SUMMARY

It is a feature of one or more embodiments of the present invention to substantially overcome, or at least ameliorate, one or more disadvantages of existing arrangements.

According to a first aspect of the present disclosure, there is provided a method of performing actions of a graph-based activity on a subset of an entity-relationship database, the entity-relationship database having entity instances related by relationship instances, each relationship instance being associated with a relationship type, each relationship type having associated metadata. The method comprises the steps of: identifying an entity instance in the entity-relationship database upon which the action is to be performed; and determining one or more entity instances related to the identified entity instance.

The method, for each determined entity instance, further performs the sub-steps of: determining the relationship type of the relationship instance relating the determined entity instance to the identified entity instance; and determining, based upon the metadata associated with the relationship type, whether the action is to be performed on the determined entity instance.

The method steps are repeated for each entity instance for which it is determined that the action is to be performed on that instance.

Other aspects of the invention are also disclosed.

BRIEF DESCRIPTION OF THE DRAWINGS

One or more embodiments of the present invention will now be described with reference to the drawings, in which.

DETAILED DESCRIPTION OF ILLUSTRATIVE EMBODIMENTS

The herein described cloud platform provides a web-based service that empowers users to solve their own business problems by creating their own web or desktop software applications without the need for computer programming or other technical knowledge. Further, web or desktop software applications created using the system may be customized using the web-based service. We present the term ReadiNow Intelligent Engines (RIE) to refer to the introduced technology including, for example, one or more of the herein-described software applications and modules.

The cloud platform also relieves the burden of important, but distracting, activities such as backup, security, scalability, and so on by providing these services within the platform itself.

Applications

Software applications can be built by users themselves, or they can be chosen from a suite of pre-written applications, which are then customized by the user. It will be understood that the cloud platform is not limited to certain software applications and so the software applications may be as varied as imagination permits. For example, the software applications provided by the RIE Technology may be directed towards customer relationship management, business continuity management, expense tracking, and so on.

The software applications include various software modules that logically make up a software experience, such as dashboards, data entry forms, reports, charts and other visualizations, as well as interactivity such as running workflows, triggering business processes, importing and exporting data, template document generation, email notifications, and so on.

Cloud Platform Construction

The design of the cloud platform is considered at the following levels:
1. The physical infrastructure and the software processes that run on the infrastructure;
2. The functional software services;
3. Multi-tenancy and application hosting;
4. The logical structure of the entity-relationship database; and
5. Client-side code.

Software Services Infrastructure

Figure 1A:
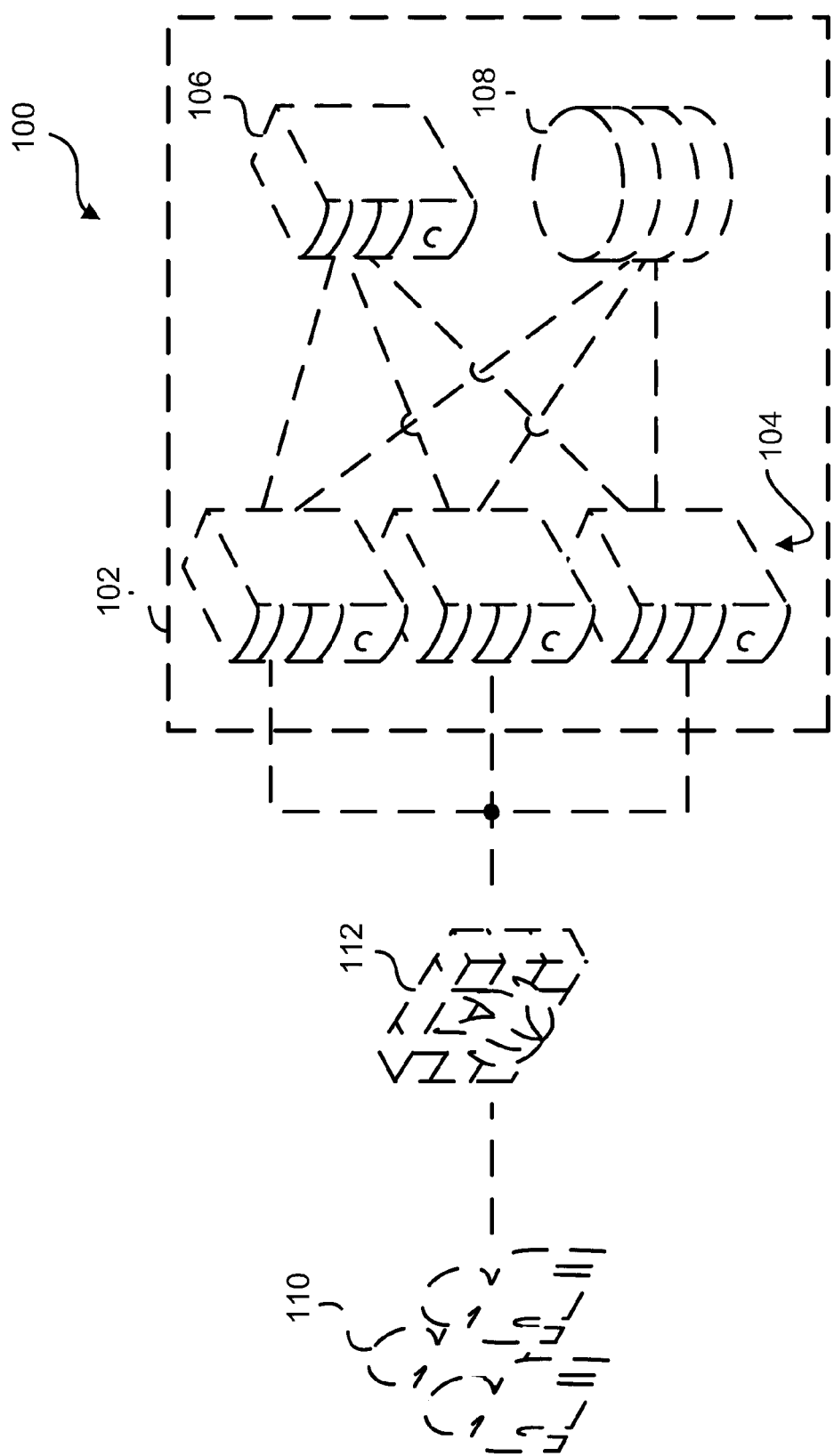
FIG. 1A shows a schematic diagram illustrating the physical infrastructure of a cloud platform.

FIG. 1A is a schematic diagram illustrating the physical infrastructure 100 of a cloud platform 102. The cloud platform 102 is arranged in a fairly typical N-tier architecture including a plurality of front end web servers 104, a cache server 106, and a database server 108. The cloud platform 102 may receive web requests from user devices 110 by an application delivery controller (ACD) 112 that routes requests to the front-end web server 104. The database server 108 may be an SQL server that houses data, and the cache server 106 may store calculated results for fast access.

Figure 1B:
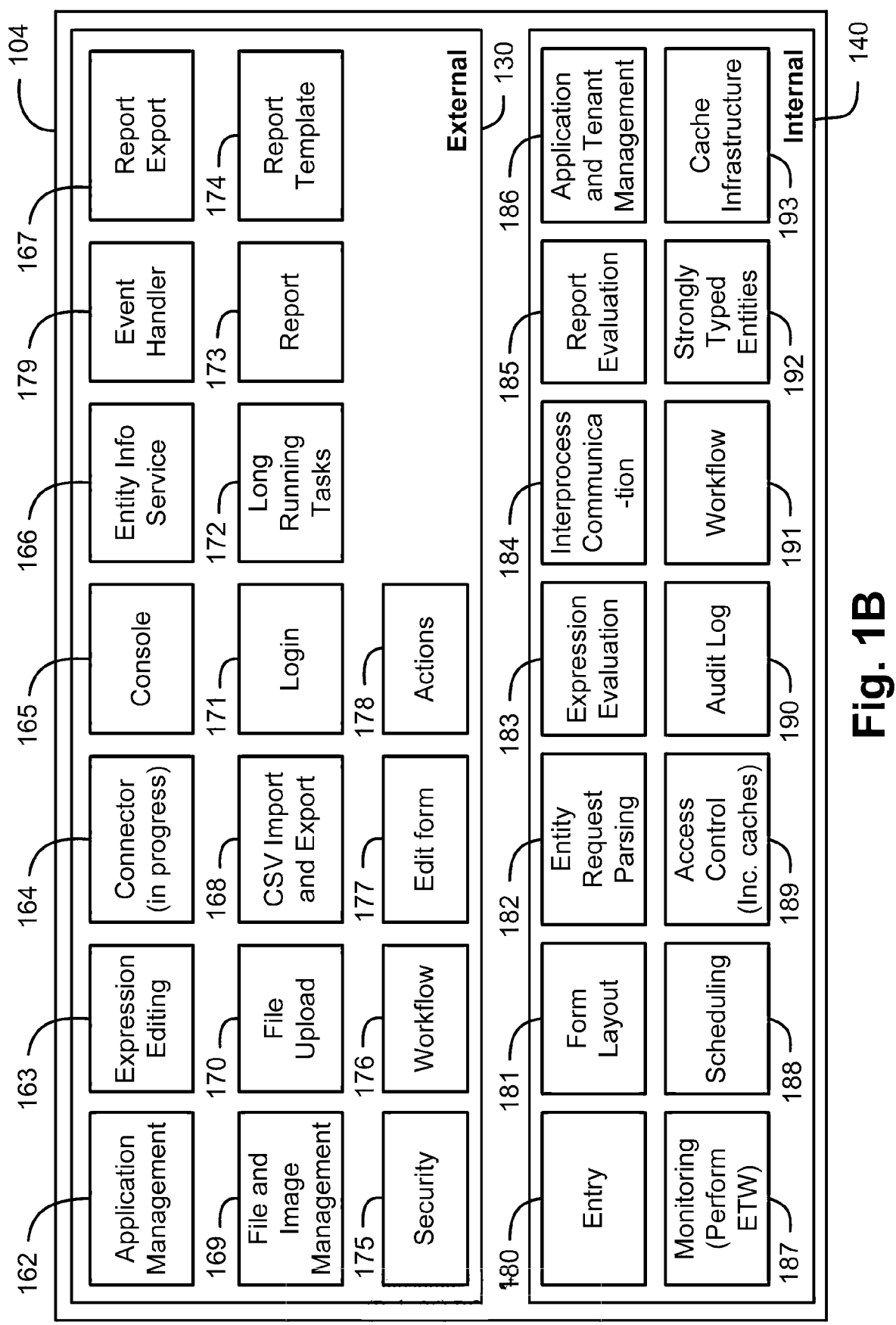
FIG. 1B shows a block diagram of a front-end server shown in FIG. 1A in more detail.

The majority of the platform software resides on the front-end web servers 104. FIG. 1B is a block diagram of the front-end server 104 shown in FIG. 1A in more detail, depicting a number of internal software modules 140 and external software module 130. The external software modules 130 are modules exposed by the front-end servers 104 to support client-side (web browser) code, whereas the internal software modules 140 are configured to support various internal features.

The External software modules 130 may include an application management module 162 that enables the installation/removal/management of software applications, an expression editing module 163 that allows syntax checking for calculations that a user can enter when editing reports, and a connector module 164 that allows the cloud platform 102 to interoperate with other online systems by exposing a data communication API. A console module 165 for loading user interface elements such as navigation links and sections, and an entity information service 166 for reading and writing entity-relationship data for communication between the client-code 110 and the front-end web 104 may also be provided.

The external modules 130 may also include a report export module 167 that provides a tabular report to be converted into a CSV (comma separated variables) or Excel file, a CSV/Excel import and export module 168 that allows tabular data to be imported into the database 108 as entities, a file and image management module 169 that supports tracking and download of documents, files, and images for storing in an entity-relationship model (ER), and a file upload module 170 that uploads files by breaking the files into multiple chunks, reassembling the chunks on the server 104, and storing the files in the database 108. Other external modules may include a login module 171 for handling user login, authentication, lockout policy, password policy, encryption, etc., and a long running tasks module 172 for tracing a process that could potentially take a long time, such as importing a very large data set.

The external modules 130 further include a reports module 173 that allows database queries to be graphically constructed, a document templates module 174 that allows macro-style Word templates to drive automated document generation, a security module 175 that allows access rules to be configured to control access to entities, a workflow module 176 that allows users to design business processes as flow charts, which can then be triggered when certain events are detected (such as if the user presses a certain button).

An edit form module 177 allows developers to build data entry forms, and present those forms to end users and an actions module 178 allows application developers to control the activities performed on entities, for example through a right-click context menu. The activities may include editing/deleting a resource, starting a workflow, or generating a document. An event handler module 179 for detecting low level changes in the ER model and performing internal code activities when the changes are detected is also provided.

The internal modules 140 include an entity module 180, which represents the ER database, and a form layout module 181 for generating default edit forms from database schema objects. An entity request parsing module 182 is provided for accepting a request from the entity information service module 166 and converting the text into an object structure for processing. An expression evaluation module 183 for performing the actual calculation process for calculations that have been entered into workflows or reports, an inter-process communications module 184 for allowing the front-end web servers 104 to communicate with each other (primarily to notify each other of data changes), and a report evaluation module 185 for converting reports into SQL database server queries, and formatting the results are also provided.

The internal modules 140 may further include an application and tenant management module 186 that supports application management, a monitoring module 187 that collects system diagnostics information, and a scheduling module 188 for scheduling activities (such as running a workflow) to occur at certain times. An access control module 189 may also be provided to implement and enforce internal security rules. Other internal modules 140 may include an audit log module 190 to detect and record security sensitive events, a workflow module 191 to implement the actual execution of a workflow, a strongly typed entities module 192 that allows an entity schema to be defined in XML and generates source code to allow programmers to program against those entities, and a cache infrastructure module 193 for caching internal server data, such as entity information, report results and so on.

In many cases, the software modules 130 and 140 may be interconnected with each other and may depend on each other. Moreover, although FIG. 1B clearly distinguishes between internal modules 140 and external modules 130, that boundary may sometimes be fuzzy.

Figure 1C:
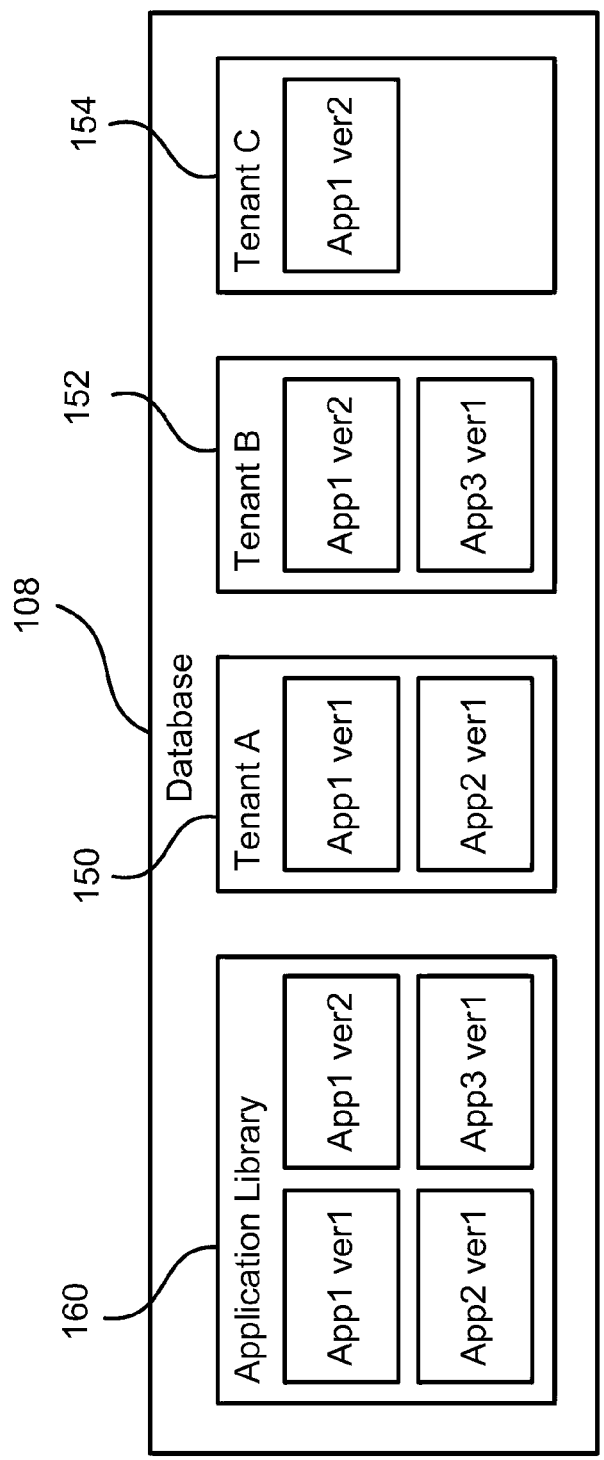
FIG. 1C shows a block diagram of an exemplary database server.

Referring again to FIG. 1A, the database server 108 hosts multiple clients (tenants). Each storage area for each tenant can have different versions of different applications installed. Separate from the tenant storage areas, an application library hosts every available version of every available application. User data is also stored within the storage area associated with each tenant. FIG. 1C depicts a block diagram of an exemplary database server 108, including storage areas 150, 152, and 154 for three tenants and an application library 160.

A single set of database tables holds all entity-relationship data for all tenants.

All user data is represented as entities and relationships. Additionally, all application components are described in the entity-relationship database. For example, a report may have columns, filters and formatting rules. These are all described as entities, and a report is connected to its columns, its filters, data source, and so on with relationships.

Moreover, the schema (or metadata) about the application is also described using entities and relationships. The types of entities that are possible; the fields that they may possess; the relationship types that are defined; rules for validating input—these are all described using entities and relationships.

This unique structure means that all software modules developed to power the cloud platform 102 equally enrich the user's web-based applications, and vice versa.

As described previously, the above systems run on the cloud platform 102. Additionally, a body of code (a software client) is sent to, and runs, on a user's web browser. This code is configured to provide a user interface for the dynamically generated applications. For application developers, this code can also support application building.

The software client is structured as a single paged application (SPA), whereby all code is loaded up front, and communication only goes back to the cloud platform 102 to fetch or modify data.

Figure 2:
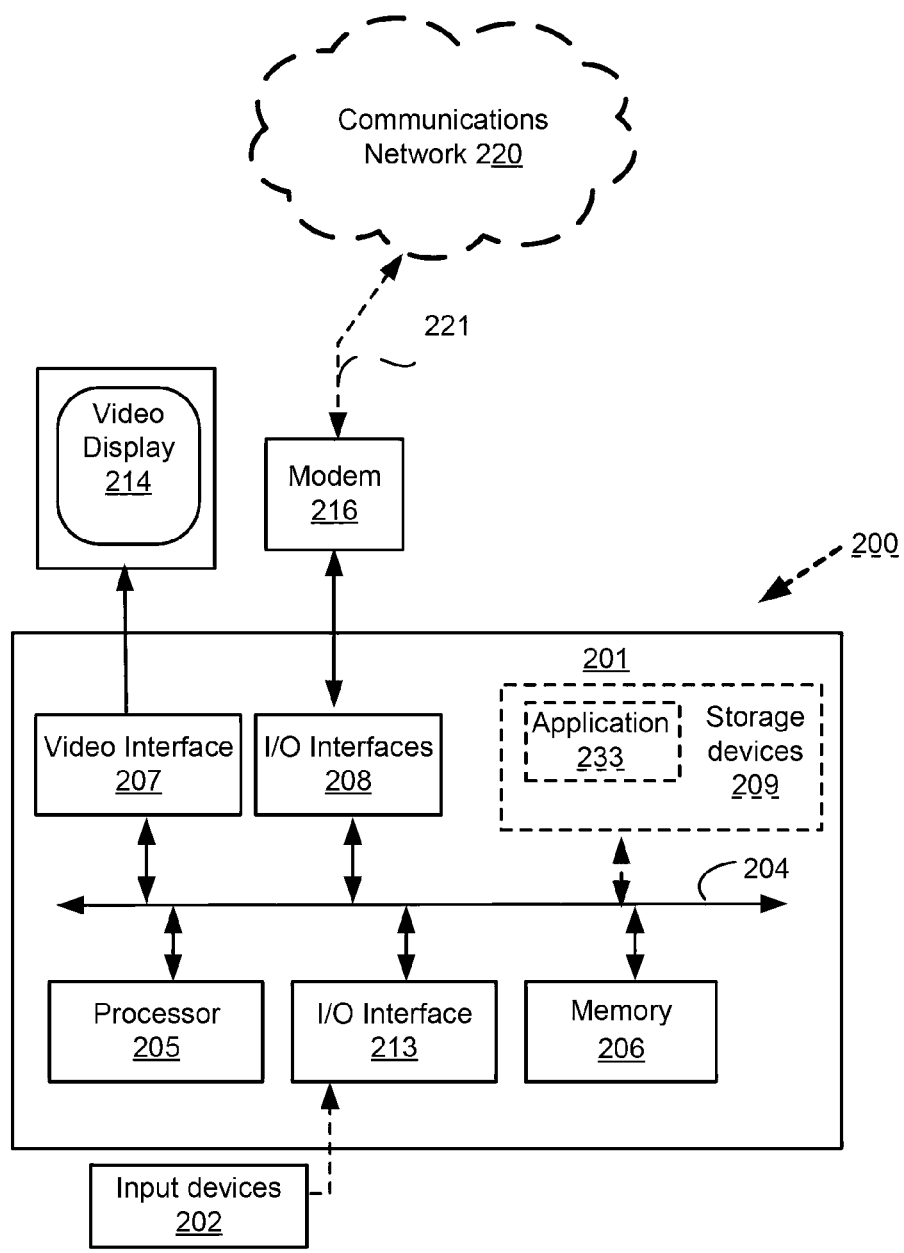
FIG. 2 shows a schematic block diagram of a general-purpose computer system upon which the various arrangements described can be practiced.

FIG. 2 depicts a general-purpose computer system 200, upon which the various arrangements described can be practiced. For example, the computer system 200 may form one or more of the servers 104 shown in FIG. 1A. As a further example, the computer system 200 may be a user devices 110 operated by a user of the system 100 shown in FIG. 1A.

The computer system 200 includes: a computer module 201; input devices 202; and output devices including a display device 214. A Modulator-Demodulator (Modem) transceiver device 216 may be used by the computer module 201 for communicating to and from a communications network 220 via a connection 221. The communications network 220 may be a wide-area network (WAN), such as the Internet, a cellular telecommunications network, or a private WAN.

The computer module 201 typically includes at least one processor unit 205, and a memory unit 206. The computer module 201 also includes a number of input/output (I/O) interfaces including: a video interface 207 that couples to the video display 214, an I/O interface 213 that couples to the input devices 202, and an interface 208 for the modem 216. In some implementations, the modem 216 may be incorporated within the computer module 201, for example within the interface 208. Storage devices 209 are provided and typically include a hard disk drive (HDD).

The components 205 to 213 of the computer module 201 typically communicate via an interconnected bus 204 and in a manner that results in a conventional mode of operation of the computer system 200 known to those in the relevant art.

The methods described herein may be implemented using the computer system 200 as one or more software application programs 233 executable within the computer system 200. In particular, the steps of those methods are effected by instructions in the software 233 that are carried out within the computer system 200. The software instructions 231 may be formed as one or more code modules, each for performing one or more particular tasks.

The software may be stored in a computer readable medium. The software is loaded into the computer system 200 from the computer readable medium, and then executed by the computer system 200. A computer readable medium having such software or computer program recorded on the computer readable medium is a computer program product. The use of the computer program product in the computer system 200 preferably effects an advantageous apparatus according to the present disclosure. Once loaded, the software 233 is typically stored in the HDD 210 or the memory 206 from where the software is executed by the computer system 200.

Entity-Relationship Model

The present disclosure uses an "entity-relationship" model or system to represent business objects. An entity represents a physical or abstract object, such as a person, a company, a computer, a car or a cost center. A distinction is made between a type of an entity and an instance of that entity. 'Car' may be an entity type, whereas a particular vehicle with a particular registration number is an instance of the Car entity type. Each entity instance has fields, such as a person's name, a car's vehicle identification number (VIN) or a cost center's code.

Entities may have relationships between them. For example, a person may own a computer, a car may be manufactured by a company or a cost center may be within a department. Similar to entities, a distinction is made between a type of a relationship and an instance of that relationship. Cars, for example, may be related to their manufacturers, and their drivers. A particular car is related to a particular car model, or particular drivers. Note that a car has one model but may have zero, one or many drivers. The type of the relationship specifies the cardinality of the relationship, namely whether multiple entities may be related—as well as whether those relationships are exclusive.

In some entity-relationship systems, it is possible to attach additional data to relationship instances—that is the relationship between two instances is itself considered an instance of sorts that can have its own fields and relationships. For example, consider a 'friend' relationship between two persons on a social network. That relationship could itself have a field that indicates the date of introduction, and a further relationship to the person who introduced the two friends.

The method of storage of entity-relationship data is beyond the scope of this disclosure. The storage may be within a traditional SQL or relational database, a graph database, XML or outside of a computer system. However, the entity-relationship model will generally expose a semantic structure that is not native to the underlying storage mechanism. In particular, the ability to traverse relationships that may exist between arbitrary entities.

A distinction is typically made between schema and data. Schema describes the structure of data. The types of entities that are possible; the fields on those types; the relationships that are possible between those types; and any inheritance structure between types; is all traditionally in the domain of schema. By contrast, instances of entities are traditionally considered as data.

Metadata means data about data. In the context of the present disclosure metadata refers to additional data stored within schema.

Nomenclature

The terms: graph, set, queue, and dictionary are used here with their standard meanings in computer science. Graph—a group of interconnected nodes. Set—an unordered group of distinct entries. Queue—an ordered group of entries that is characterized by enqueuing items onto one end, and dequeuing them from the other. Dictionary—provides an efficient association between one value and another.

Schema Storage Mechanism Used

The present disclosure provides common mechanisms for operating on heterogeneous types of components. That is achieved by leveraging a consistent storage mechanism for schema information.

As described above, schema and data are ordinarily distinct. However, schema data is in reality another form of structured data. Entity-types can be another type of entity—namely they are of type 'entity type'. In the same way that a specific car is an instance of the 'Car' entity type; the rules that govern the 'report' entity type are themselves an instance of 'entity type'.

Similarly, the schema information about each field on an entity may itself be described as an entity of type 'field'. Entity types may be related to the fields that are applicable to the entity types via a relationship. The name of the field may simply be stored as a 'name' field of the 'field' entity type. Other properties of the field schema (such as whether the field is a mandatory field, or other constraints) may similarly be described by defining fields on the 'field' entity type; in the same way that data about cars can be permitted by defining fields on the 'Car' entity type.

Relationship schema may also be described by having instances of a 'relationship type' entity type. The following data may be stored about a relationship schema definition: 1. the two types of entities that the relationship causes to be related; 2. the name of the relationship; 3. whether the relationship is mandatory; 4. whether the relationship is exclusive, in either or both direction. (This is sometimes referred to as cardinality, and is given names such as many-to-many, many-to-one, one-to-one).

As a concrete example, consider the relationship between a fictitious driver 'Bob' and his car 'ABC123'. There may be other drivers who own other cars. An entity type 'Driver' is defined, and 'Bob' is an instance of the entity type 'Driver'. An entity type 'Car' is also defined, and the car 'ABC123' is an instance of the entity type 'Car'. A relationship is defined in the schema between entity types 'Driver' and 'Car' called 'driver owns car'. This relationship in the example is a one-to-many relationship, to indicate that one driver may own many cars, but each car may only be owned by one driver. Further, the relationship may be set to non-mandatory in either direction: drivers may not own cars; cars may not be owned by drivers.

The relationship 'driver owns car' is itself an instance of 'relationship type'. The 'relationship type' entity type has various fields defined such as name, cardinality, and 'is mandatory'. So, the relationship 'driver owns car' is an instance of 'relationship type' and defines values for those fields 'driver owns car', 'many-to-one', and 'false' respectively.

The present disclosure relies heavily on defining additional fields on the relationship schema, that is the 'relationship type' entity type. For example, fields are defined including, for example, what the implication is for the driver if the car is deleted, or if the car is duplicated. These additional fields allow for generalized implementations of such operations.

Thus, a system and method of generalizing the representation of application components and sub-components, as well as business objects and data into an entity/relationship data is provided. Metadata is associated with the schema, such that various activities that would ordinarily have to be hand-coded on a per-component basis can instead be achieved through more generalized mechanisms that operate over a wide variety of component types by using the metadata.

Mechanisms for generalizing the following activities are presented:
Mechanism for ensuring that all sub-components and links are deleted when an instance of an application component is removed, without regard to component type;

Mechanism for ensuring that all-sub components are duplicated, but referenced components are only linked, when an instance of an application component is copied, without regard to component type;

Mechanism for ensuring that all dependent sub-components of a component are captured in a package if the application is packaged, without regard to component type; and Mechanism for categorization of relationship types such that the metadata for the above does not need to be specified on a case-by-case basis.

Method of Performing Generic Graph Actions Using E/R Metadata

Figure 3:
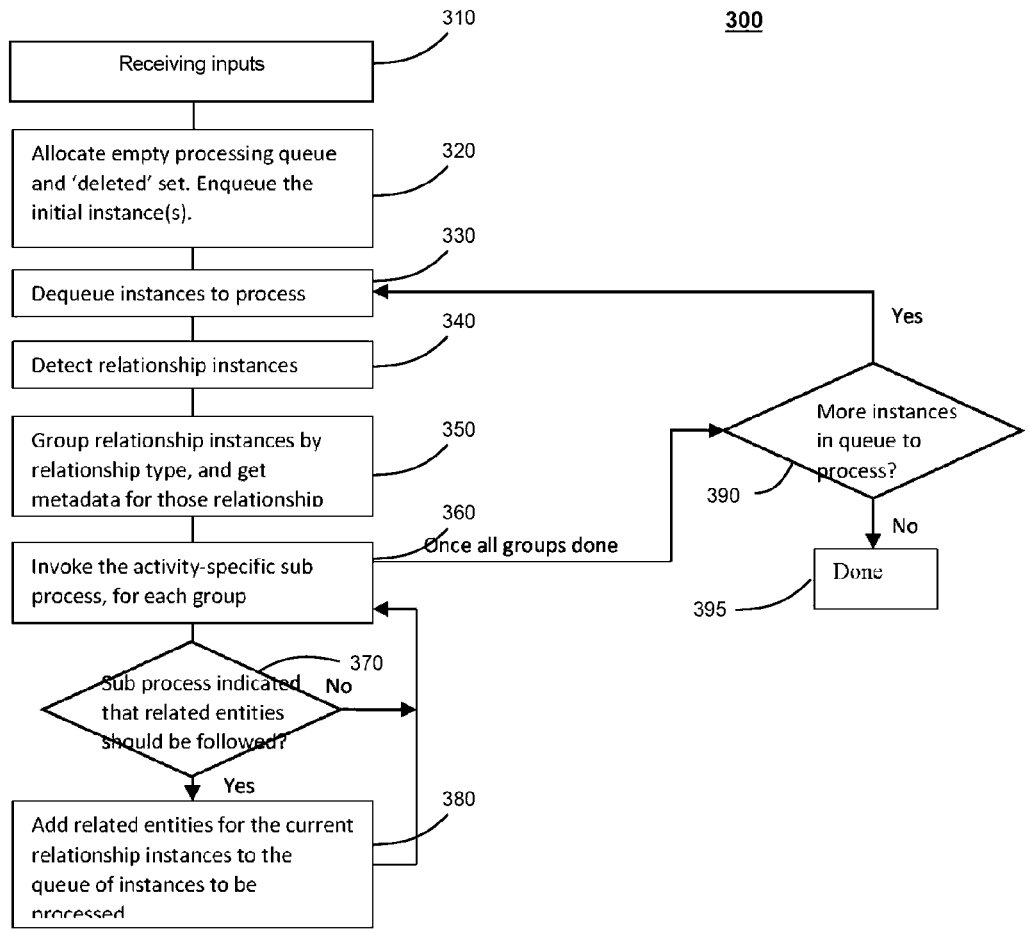
FIG. 3 shows a schematic flow diagram of a method of performing actions of a graph-based activity on a subset of an entity-relationship database by using metadata stored on relationship types of the entity-relationship database.

FIG. 3 shows a schematic flow diagram of a method 300 of performing actions of a graph-based activity on a subset of an entity-relationship database by using metadata stored on relationship types of the entity-relationship database.

Method 300 generally operates by starting at a particular entity, traversing relevant relationships of that entity, and performing the action at each entity along the way. More specifically, as each relationship instance is considered, the type of that relationship is determined and any relevant metadata on that relationship type is determined. The entities in question, and the relevant relationship metadata type, are passed into the activity-specific sub process, which enacts the action on those entities, as well as determining whether the method 300 should continue further traversing the graph along those entities.

The method 300 starts at step 310 where the following are received as inputs:

the entity-relationship database, where relationship instances are associated with a relationship type;

relationship type schema, with metadata associated with each relationship type, either including general categorization metadata as described below, or activity specific metadata;

a sub process, function pointer, delegate or call-back, that enacts the specific action at hand. For example, the sub-process may be the sub-process that actually performs the delete action in a cascade delete case, or the copy action in an entity graph cloning case, those being described in detail below;

the particular entity instance(s) on which the action is to commence; and optionally the input may include a separate 'finalization' sub-process for the action that performs any concluding tasks once all relevant entities have been processed.

Method 300 next, in step 320, allocates an empty 'queue' of entity instances that need to be processed. Method 300 also in step 320 allocates an empty 'set' of entity instances that have already been processed, which is used to detect and mitigate any cycles in the processing. Step 320 further enqueues to the processing queue the particular entity instance(s) on which the action is to commence that is received as input in step 310.

In step 330 an entity instance (or set of instances simultaneously) is dequeued from the queue, and added to the set of entity instances that have been processed.

In step 340 that follows, all relationship instances from that entity (or those entities) are detected, in both the forward and backward directions.

Optionally, if the system supports fields and relationships being added to relationship instances by representing relationship instances as entity instances themselves: Enqueue all of the relationship instances onto the queue defined in step 320, so that they too are recursively processed.

In step 350, for the relationship instances detected in step 340, the relationship type of each relationship instance is determined, and the relationship instances are grouped by relationship type. For each relationship type, the metadata associated with that relationship type is also loaded. If the metadata is direction-specific, then load the forward metadata if the relationship was followed in the forward direction, and the reverse metadata if the relationship was followed in the reverse direction.

Step 360 follows where, for each group of relationship instances (i.e. each relationship type), the activity-specific sub-process is invoked, and the following data is passed into the activity-specific sub-process:

the relationship type, and its associated metadata (for the relevant direction);

the set of related entity instances from step 350 in the current group; and the originating entity instances from which they are related.

The activity-specific sub-process then, in step 370, inspects the relationship type metadata, determines what action if any needs to be performed, and performs that action. The activity-specific sub-process also returns a result that indicates whether method 300 should continue to traverse the graph along those entity instances.

If the activity-specific sub-process indicates that the graph needs to be further traversed, then the related entity instances are then placed onto the 'to process' queue of step 380, and steps 360 to 380 are repeated for each group of relationship instances until all the groups of relationship instances are process.

The method 300 then progress to step 390 where it is determined whether any more entity instances remain in the queue to be processed. If entity instances remain in the queue, then the method 300 returns to step 330. Otherwise, if it is determined in step 390 that there are no more entity instances in the processing queue, then method 300 terminates in step 395.

In some cases it will be more convenient to simply process each relationship instance one at a time, reconsidering its relationship type in turn, rather than batching them into groups.

Individual activity-specific implementations may also need to perform purpose specific finalization tasks once all relationships have been visited and processed, i.e. after step 390 and before step 395.

Cascade Delete

Having described the method 300 of performing generic graph actions using entity-relationship metadata, specific graph-based actions are next described. A first example of a specific graph-based action that is described is cascade delete.

In a relational (table-based) database, such as Microsoft SQL Server, a common feature is the ability to define a foreign key constraint on a table. Two database tables can have a constraint placed on them such that for each row, a particular column (or columns) must correspond to data in another column of the other table.

If an attempt is made to delete a row from the second table, such that the constraint would be violated on the first table, the database engine may be configured to perform one of two actions: either prohibits the row from being deleted, or causes the corresponding rows in the first table to be deleted. The latter is commonly called "cascade delete". The "cascade delete" disclosed herein is distinct from that performed in relational databases, primarily due to the fact that the present disclosure relates to an entity/relationship database.

For cascade delete according to the present disclosure, the metadata stored associated with relationship types of the entity-relationship database includes one or two true/false fields or flags that specify how instances of that relationship type should be treated in the event that either of the entity instances being related to each other by a relationship of that type are deleted, or if the relationship instance itself is deleted.

Relationships are usually directional, and the behavior in event of deletion depends on which side of the relationship the entity is that is being deleted. Consider a relationship between a customer and their subscriptions. This relationship may be modelled as a relationship from an entity type 'Customer' to an entity type 'Subscription', called "Customer subscriptions". Each customer may have multiple subscriptions. Intuitively, if a customer is removed from the system, then all of their subscriptions will need to be removed. However, if a given subscription is removed, then it does not imply that the customer should be removed.

Accordingly, the metadata stored on this particular relationship type indicates that relationships of that type should cascade delete in the forward direction, but not the reverse direction. This is achieved by setting a 'cascade forward deletes' field of the "Customer subscriptions" relationship type to true. Conversely, a 'cascade reverse deletes' field is set to false, to indicate that deleting the subscription should not delete the customer.

Any deletion of an entity instance at either end of the relationship implies that the relationship instance itself is also deleted, irrespective of the cascade delete settings in either direction. This is because it is not possible to have a relationship to something that does not exist. The cascade delete settings only control whether the entity instance at the other end of the relationship is also deleted.

As each entity instance is deleted, it in turn may have relationships of various types to other entity instances. The relationship type of those relationships will determine whether they in turn cause other entity instances to be cascade deleted. Method 400 described in detail below also provides for the possibility that the cascading sequence of entities may involve cycles. That is, the chain of dependencies can safely loop back to earlier entities that have already been deleted.

In a system where schema objects are also represented in the entity-relationship database, it is possible (indeed intended) that a cascade mechanism may result in schema objects being deleted. That is, if an instance of 'entity type' is deleted, then all instances of that entity type will also be flagged for cascade delete, and the cascade delete will continue from those entities as well.

If an instance of 'relationship type' is deleted, then all instances of those relationships will be deleted, similarly triggering any further cascade deletes that may result.

If an instance of 'field type' is deleted, then all field data associated with that field type will be deleted.

The implementation of cascade delete described in detail below allows for deletions to effectively be processed in parallel by performing each operation over a set of entities simultaneously.

Figure 4A:
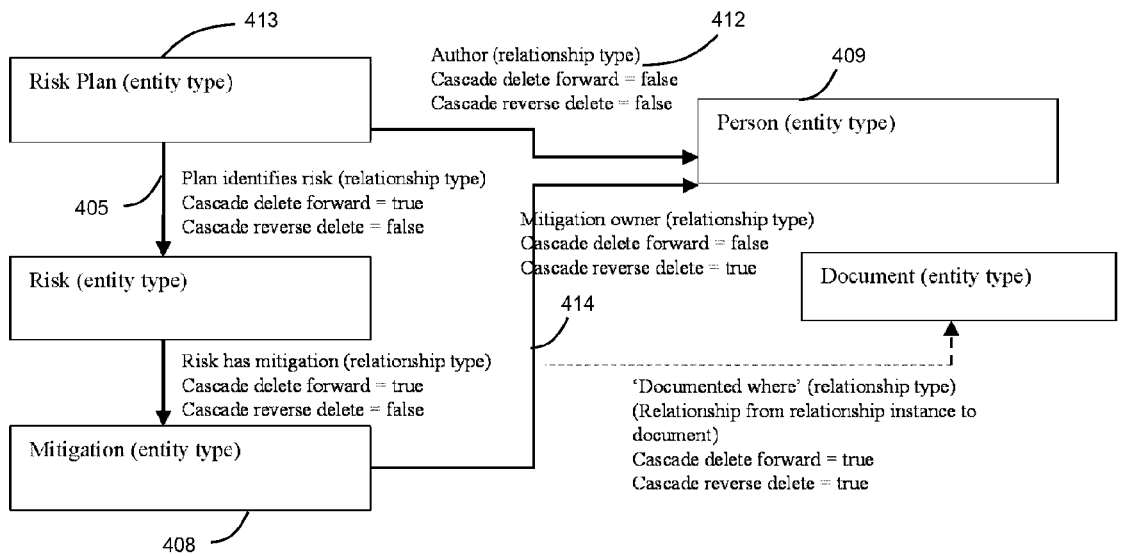
FIG. 4A shows a graph of an example schema that includes cascade-delete metadata associated with the relationship types.
Figure 4B:
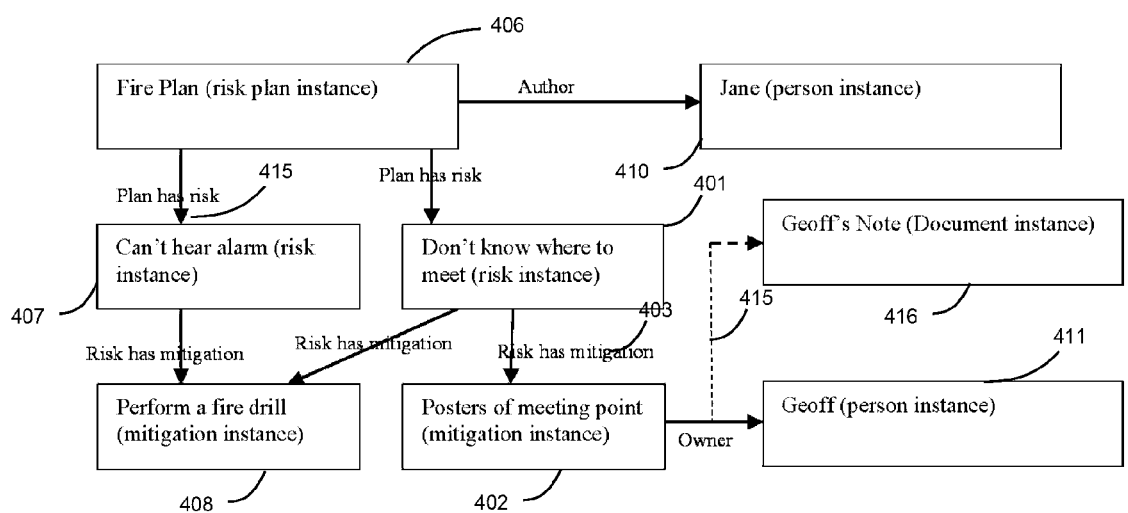
FIG. 4B shows a graph of example data built on the example schema shown in FIG. 4A.

FIG. 4A shows a graph of an example schema that includes cascade-delete metadata associated with the relationship types. FIG. 4B shows a graph of example data built on the example schema shown in FIG. 4A.

In this example, deleting the 'Don't know where to meet' risk instance 401 (FIG. 4B) would cause the 'posters of meeting point' mitigation instance 402 to be deleted, because those instances 401 and 402 are related by a 'Risk has mitigation' relationship 403, and that type of relationship is defined with the 'cascade forward deletes' flag set to true. However, deleting instance 401 would not cause the overall plan 406 to be removed, because the "plan has risk" relationship 404, which is of 'plan identifies risk' relationship type 405 (FIG. 4A) is defined with the 'cascade reverse deletes' flag set to false.

Deleting the overall "Fire Plan" instance 406 (FIG. 4B), would cause all of listed risks 401 and 407 to be deleted, because those risks 401 and 407 are all related to the 'Fire Plan' entity instance 406 by relationships 404 and 415 that are of type 'Plan identifies risk' 405 (FIG. 4A), which has the 'cascade forward deletes' flag set to true. Those deletions of risks 401 and 407 (FIG. 4B) would then cascade onto deletion of the mitigation instances 402 and 408 for the same reason. However, deleting the 'Fire Plan' entity instance 406 would not cause instances of the Person entity type 409 (such as Jane 410 or Geoff 411) to be deleted, because the Author relationship type 412 that relates the Person entity type 409 to the Risk Plan entity type 413 has the 'cascade forward deletes' flag set to false.

On the other hand, deleting person instance 'Geoff' 411 (FIG. 4B) would cause the 'Posters of meeting point' mitigation instance 402 to be deleted, because the 'mitigation owner' relationship type 414 (FIG. 4A) has the 'cascade reverse deletes' flag set to true. Further, it would also delete the "Documented where" relationship instance 415 to Geoff's Note 416 and trigger a deletion of Geoff's Note 416.

Deleting just the "Can't hear fire alarm" 407 or "Don't know where to meet" 401 risk instances on their own are insufficient to cause deletion of the "Perform a fire drill" mitigation instance 408, because in either case the other is sufficient to prevent deletion. The "Can't hear fire alarm" 407 and "Don't know where to meet" 401 risk instances must both be deleted (either explicitly, or by deleting the Fire plan risk plan instance 406) to cause the "Perform a fire drill" mitigation instance 408 to be deleted.

Figure 4C:
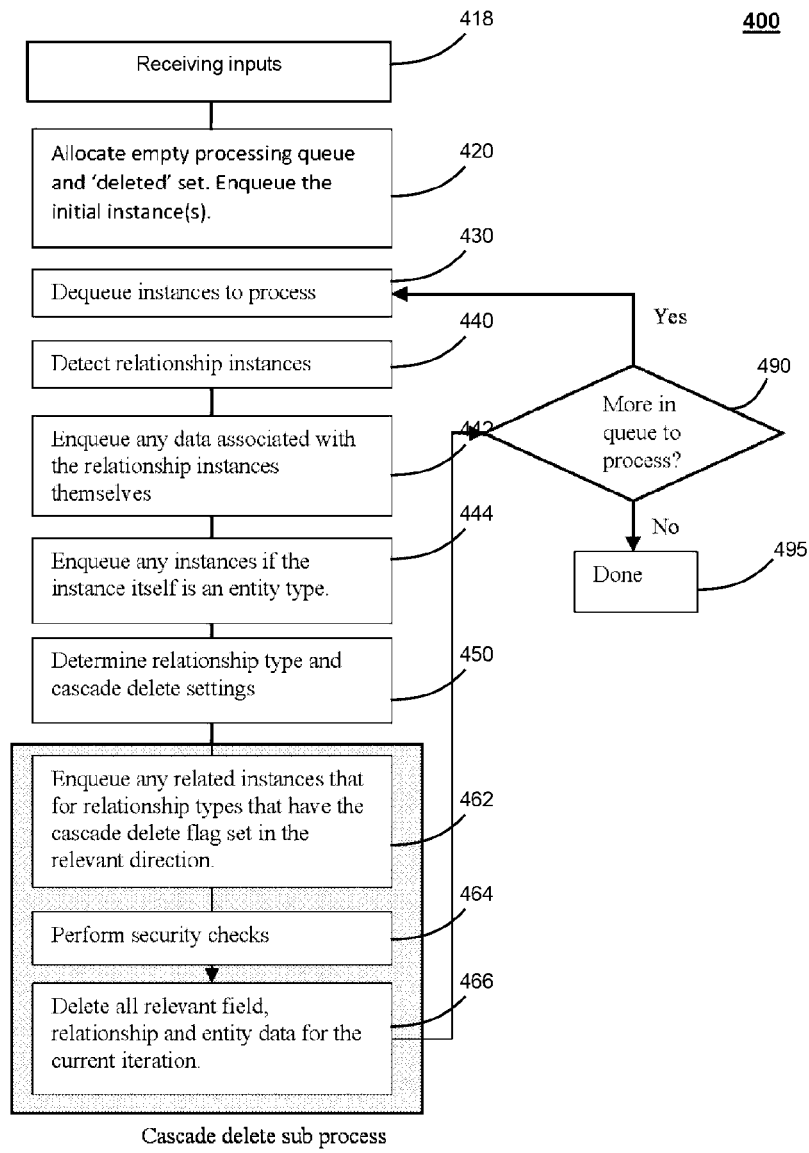
FIG. 4C shows the method of cascade delete according to the present disclosure.

FIG. 4C shows the method 400 of cascade delete according to the present disclosure. Method 400 starts in step 418 where the following are received as inputs: the entity-relationship database; the relationship type schema; a cascade delete sub process; and the particular entity instance on which the cascade delete is to commence.

In step 420 that follows, an empty queue of entity instances that need to be processed is allocated. Also in step 420 an empty set of entity instances that have already been processed is allocated. Step 420 further enqueues to the processing queue the entity instance that is received as input in step 410.

In step 430 an instance (or set of instances simultaneously) is dequeued from the queue, and added to the set of entities that have been processed. Next, in step 440, all relationship instances from that entity (or those entities) are detected, in both the forward and backward directions.

In optional step 442, if the system supports fields and relationships being added to relationships instances by representing relationship instances as entity instances themselves: Enqueue all of the relationship instances onto the queue defined in step 420, so that they too are recursively processed for cascade deletes.

In optional step 444, if the system provides for entity types being represented as entities: for all entities dequeued in step 430, determine if any of those entities are of type "entity type" and if any entities are, enqueue all instances into the processing queue.

In step 450, for the relationship instances detected in step 440, the relationship type of each relationship instance is determined, and the current value of the 'cascade forward deletes' and 'cascade reverse deletes' fields are determined.

Steps 462, 464 and 466 follow, those steps being the cascade delete specific sub-process. Step 462, for forward relationships, enqueues instances at the other end of the relationship onto the queue if that forward relationship has the 'cascade forward deletes' flag has a value of true. Similarly, for relationship instances that are followed in the reverse direction (namely where the entity in step 430 was the target side of the relationship), the entity instance at the other (source) end is examined if the relationship type has the 'cascade reverse deletes' flag having a true value. In both cases, the entity instance is examined to see if there are other relationship instances of the same relationship type to the current entity instance being examined. If there are no other relationship instances pointing to that entity instance, then enqueue the entity for processing. Step 462 also checks the processed queue to ensure that any entity instances are not also in the 'deleted' set, and if they are, then such entity instances are deleted.

Step 464 then checks that the user has permission (both sufficient privileges, and there is no read-only flag set) to delete the newly enqueued entities. If the user does not have permission, then method 400 is abandoned as the user is attempting to delete a structure, but does not have permission to do so for at least one of the component parts of that structure. Alternatively, step 466 deletes all relationship instances identified in step 440 from the database, remove all field data from the database associated with any instances that are determined to be of type "field", and delete the instance (or instances) dequeued in step 430 from the database.

The method 400 then progress to step 490 where it is determined whether any more entity instances remain in the queue to be processed. If entity instances remain in the queue, then the method 400 returns to step 430. Otherwise, if it is determined in step 490 that there are no more entities in the processing queue, the method 400 terminates in step 495.

As another example of cascade delete, consider a report that consists of columns, and those columns consist of formatting rules. The report itself also has filtering rules and layout settings. These sub-components are all represented as entities and related using relationships having cascade delete enabled. The report may be ordered by a certain column, represented as a special ordering relationship between the report and a column. The report may in turn point to a data source, using a relationship with cascade delete disabled.

It will be possible to delete the overall report, causing all components to be removed, except the underlying data source (intentionally). Alternatively, a single column may be deleted from the report, and have any formatting data associated with just that column deleted. If that column happens to be the ordering column, then that data can also be deleted.

The entire specification for how to delete all or part of the report therefore consists only of some metadata on a few relationship types, along with the above described method 400 for deleting entity-relationship data.

Similarly, other application components such as charts, workflows, user interface forms, etc, may have internal components that get deleted, as well as relationships to each other, in the knowledge that they will all be appropriately deleted. Such components may all also be placed in either a folder structure, or in an application package, and in each case safely deleted when the folder or application package is deleted respectively.

Entity Graph Cloning

A second example of a specific graph-based activity described is entity graph cloning in which copies of complex entity graphs are created. In this example, one or two true/false settings are specified on the relationship type, the settings specifying how particular instances of that relationship type should be treated in the event that either of the entity instances being related to each other are copied.

More particularly, each relationship type defined on the schema has two clone settings—the first setting defining the clone operation encountered in one direction along the relationship, and the second setting defining the clone operation encountered in the other direction along the relationship. These will be termed the 'clone forward' and 'clone reverse' settings respectively.

Each of those two settings may be set to one of three states namely:

Do not clone—indicates that neither the relationship or the related entity should be cloned in the event that the source entity is cloned;

Clone by reference—indicates that the newly cloned source instance should have a relationship instance created that points to the old existing target resource; and Full clone—indicates that the target instance should also be cloned, and a new relationship instance established between the cloned source instance and the cloned target instance. Further indicates that the cloning operation should be propagated through any other relationships of the target instance.

Figure 5A:
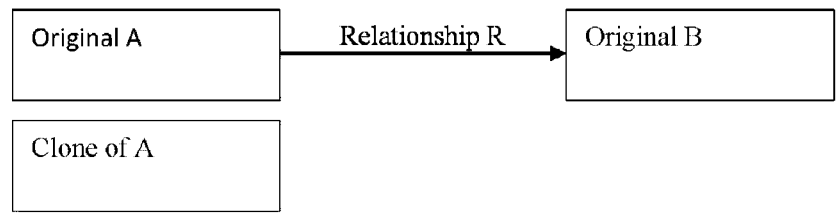
FIGS. 5A to 5C illustrate the impact of each of three possible clone settings.
Figure 5B:
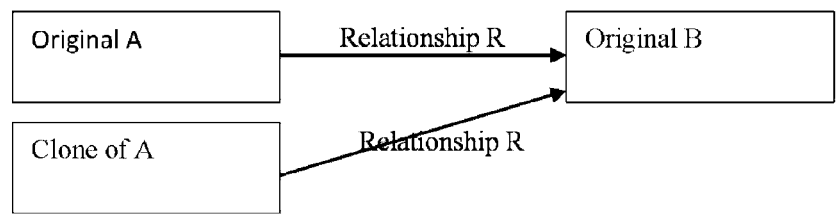
Figure 5C:
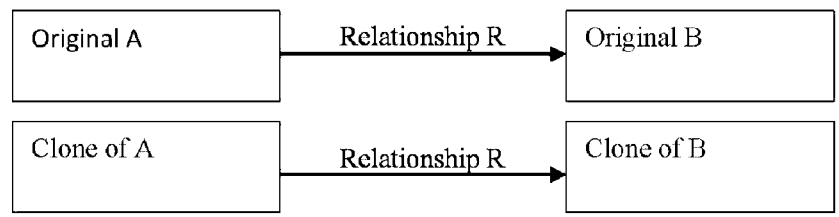

FIGS. 5A to 5C illustrate the impact of each of the three possible settings. FIG. 5A illustrates entity instance 'Original A' being related through relationship instance R to entity instance 'Original B'. When entity instance 'Original A' is cloned and the 'forward clone' setting associated with the type of relationship R is set to state 'Do not clone', entity instance 'Clone of A' is created, but the relationship and the related entity instance 'Original B' are not cloned.

FIG. 5B illustrates the case where the 'forward clone' setting associated with the type of relationship R is set to 'Clone by reference'. Entity instance 'Clone of A' is created, with that entity instance having a relationship instance R created that points to the entity instance 'Original B'. Entity instance 'Original B' is not cloned.

FIG. 5C illustrates the case where the 'forward clone' setting associated with the type of relationship R is set to 'Full clone'. In this case both the entity instances 'Original A' and 'Original B' are cloned, forming entity instances 'Clone of A' and 'Clone of B'. Furthermore, the relationship instance Relationship R is formed between entity instances 'Clone of A' and 'Clone of B', that relationship instance being a clone of the relationship relating entity instances 'Original A' and 'Original B'.

Figure 5D:
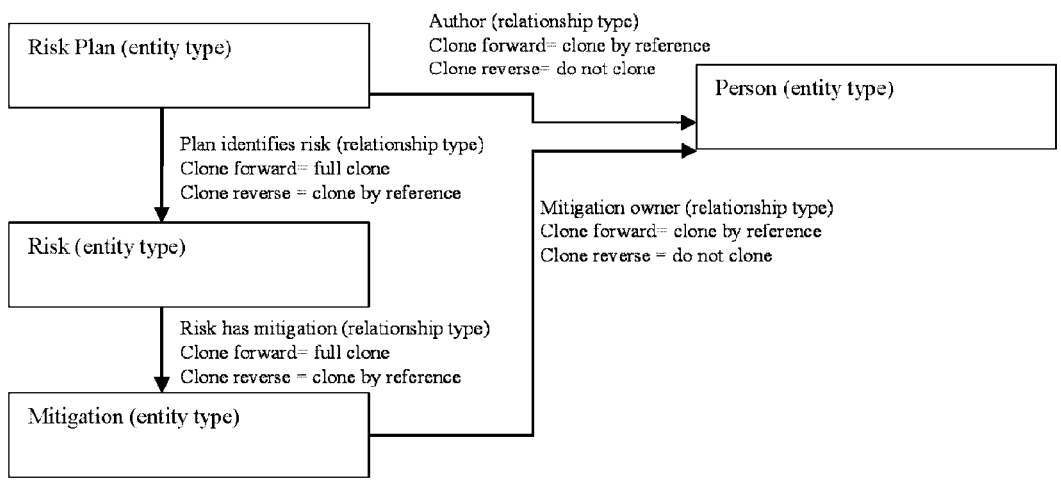
FIG. 5D shows a graph of an example schema that includes cloning metadata on the relationship types.

In order to illustrate the entity graph cloning consider the graph of an example schema that includes cloning metadata on the relationship types shown in FIG. 5D. The example schema shown in FIG. 5D is the same as that shown in FIG.

4A, but in the case of FIG. 5D the cloning metadata is shown. Reference is also made to FIG. 4B showing a graph of example data built on the example schema.

If an individual risk instance, such as 'Can't hear alarm' 407 (FIG. 4B) is cloned, then any of its mitigation instances are also cloned, such as the instance 'Perform a fire drill' 408 because the 'risk has mitigation' relationship type has the 'clone forward' setting set to 'full clone' (and the relationship is forward from risk to mitigation).

If the 'Don't know where to meet' risk instance 401 is cloned, then both of its mitigations 402 and 408 are also cloned, and the newly formed risk is related to the newly formed mitigations.

However, in both cases the overall 'Fire plan' 406 is not cloned, the reason being that the 'plan identifies risk' relationship type has the 'clone reverse' setting set to 'clone reference'.

When a risk is cloned, then the relationship back to the Risk Plan entity type 413 is in reverse, so the 'clone reverse' setting will apply, which in this example is to clone by reference. Therefore, when the Risk entity type instance is cloned, the newly formed risk instance is merely connected to the existing plan. This particular configuration makes it easy to clone a Risk within a Risk Plan.

It is noted that, in the event that the 'Don't know where to meet' risk instance 401 is cloned, then the 'Posters of meeting point' mitigation instance 402 is also cloned. In cloning that mitigation instance 402, a relationship to Geoff 411 as the owner is also formed.

Consider a scenario where a new employee starts at the company. It may be convenient to clone the Jane person instance 410. As the author of the Fire plan instance 406, there is a relationship between the two entity instances 406 and 410. However, because this relationship has a clone setting of 'Do not clone' in the reverse direction, an attempt to clone the Jane person instance 410 does not result in a new copy of the Fire plan instance 406, nor does it even result in an 'Author' relationship 412 between the new clone and the fire plan instance 406.

Figure 5E:
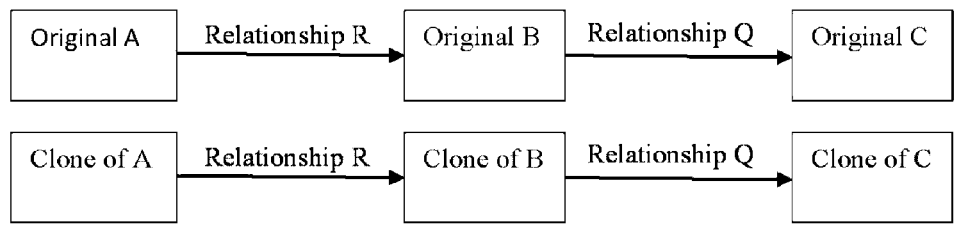
FIG. 5E illustrates the manner in which clone operations cascade.

Clone operations also cascade. Referring to FIG. 5E, if entity instance 'Original A' is cloned forming the entity instance 'Clone of A', and Relationship R is marked as 'Full clone', then the target instance 'Original B' is fully cloned forming the entity instance 'Clone of B'. The new source entity instance 'Clone of A' is also related to the new target entity instance 'Clone of B' through Relationship R, which has the same properties as the relationship instance Relationship R relating entity instances 'Original A' and 'Original B'. Because the target instance 'Original B' is fully cloned, any subsequent relationships, in this case Relationship Q, are also assessed for cloning. In the example Relationship Q also has a clone setting of 'Full clone', and 'Original C' is cloned to form 'Clone of C', together with the relationship instance Relationship Q relating 'Clone of B' and 'Clone of C'. The clone therefore effectively cascades.

Considering again the example illustrated in FIG. 4B. In the event that the entity instance 'Fire Plan' 406 is cloned, as is evident from FIG. 5D, since the 'Plan identifies risk' relationship type relating the Risk Plan entity type and the Risk entity type has a clone setting of 'Full clone' in the forward direction, the Risk entity instances 401 and 407 are also cloned. For similar reasons the mitigation instances 402 and 408 are also cloned. However, the person entity instances 'Jane' and 'Geoff' are not cloned, because in both cases the relationship types are marked 'clone by reference' in the forward direction.

In the manner described above, when an entity instance is cloned, effectively an entire graph of multiple interrelated entity instances is potentially being cloned. Further, those entity instances may still be referencing other instances that are not being cloned.

Importantly, every entity instance in the source graph is represented by at most one corresponding instance in the resulting clone graph. Considering again the example of FIG. 4B, if the Fire Plan risk plan instance 406 is cloned, then both identified risks 401 and 407 are cloned, with those cloned risks being related to the same clone of the 'perform a fire drill' mitigation instance 408. Even though both risk instances 401 and 407 are cloned, and even though cloning either one of those risk instances 401 and 407 would result in its risk mitigation being cloned; an attempt to clone both of them at the same time (implicitly by cloning the fire plan) would instead result in only a single cloned copy of the 'perform a fire drill' mitigation instance 408, with both of the newly cloned risk instances relating to this one newly cloned mitigation instance. Accordingly, the overall structure of the resulting graph is unchanged.

In a complex entity-relationship model, there will be scenarios where multiple paths will lead to the same entity instance through different types of relationships. And those relationships may specify different types of cloning.

In general the resolution is as follows: if the original graph contains a relationship of type R between entity instances A and B, and both entity instances A and B ultimately end up being cloned, then irrespective of the settings of the relationship type R, a relationship of type R is established between the cloned copy of A and the cloned copy of B. No relationship of type R is established between the clone of entity instance A and the original of entity instance B, nor will a relationship of type R be established between the clone of entity instance B and the original of entity instance A.

Put differently, if some other relationship path results in both entity instances A and B being identified to be completely cloned, then the entire nature of the relationship between entity instances A and B is cloned along with the clones of entity instances A and B. The relationship cloning settings are intended to define a boundary on where to stop cloning, but are not applicable in instances where both ends are already being cloned for some other path.

Figure 5F:
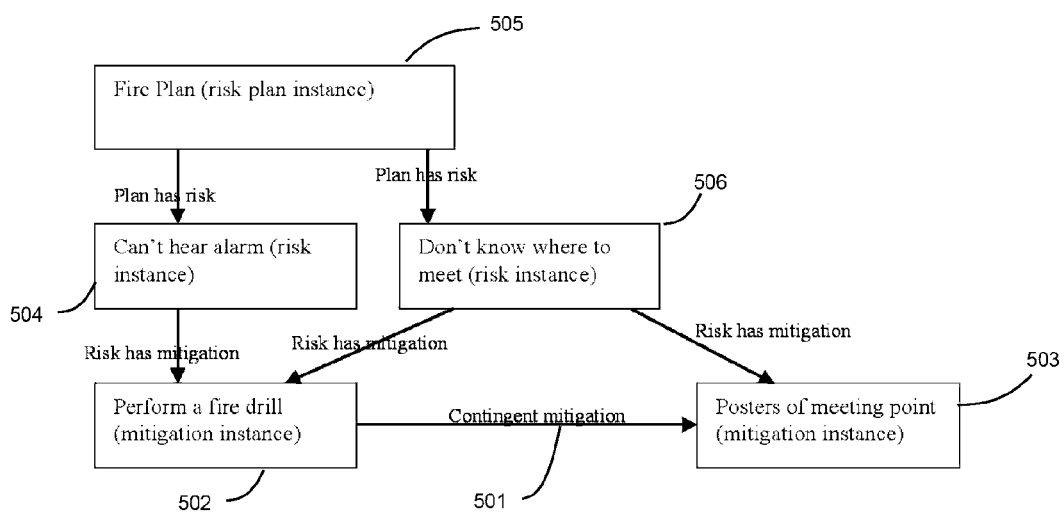
FIG. 5F shows another example graph of data built on the example schema shown in FIG. 5D.

Consider another example shown in FIG. 5F of a graph of data built on the example schema shown in FIG. 5D. The present example is similar to that shown in FIG. 4B, but a new relationship type called 'contingent mitigation' 501 is added that relates the mitigation instance 'perform a fire drill' 502 to the mitigation instance 'posters of meeting point' 503 to indicate that the mitigation instance 'perform a fire drill' 502 is contingent on the mitigation instance 'posters of meeting point' 503.

FIG. 5D would be updated by adding a new relationship type arrow from the 'Mitigation' entity type and then connects back to the same 'Mitigation' entity type again. That is, both ends of the relationship type arrow connect to the 'Mitigation' entity type.

Consider that the type of this relationship 501 is marked as 'clone by reference' in both directions. Also, the new relationship type arrow added to FIG. 5D would be labelled to have the 'Clone forwards' setting as well as the 'Clone reverse" setting set to 'clone by reference'. If the 'perform a fire drill' mitigation instance 502 is cloned, then any references to contingent mitigation instances are cloned—but the contingent mitigation instances themselves are not cloned. Accordingly, the new cloned 'perform fire drill' mitigation instance relates to the existing 'posters of meeting point' mitigation instance 503 as a contingent mitigation. Similarly if the 'can't hear alarm' risk instance 504 is cloned, then the 'perform a fire drill' mitigation instance 502 is cloned, but not the 'posters of meeting point' mitigation instance 503.

However, if a clone of the overall 'fire plan' risk plan instance 505 is made, then both risk instances 504 and 506 are cloned, and therefore both mitigation instances 502 and 503 are cloned. Since both mitigation instances 502 and 503 are being cloned, the new 'Perform a fire drill' mitigation instance in the new 'fire plan' risk plan instance will relate to the new 'posters of meeting point' mitigation instance as its contingent mitigation.

It is noted that relationship cardinality, such as many-to-many, many-to-one, and one-to-one can place restrictions on relationship types. For example, a many-to-one cardinality may be established on the relationship type mitigation owner in FIG. 5D, dictating that each mitigation instance may only have one owner.

Cardinality may have an impact on entities that are cloned by reference. For example, if the relationship type mitigation owner was set to 'Clone by reference' in the reverse direction (instead of 'Do not clone' setting as depicted in FIG. 5D), then any attempt to clone the entity that represents the person (Geoff in the example) would cause any related mitigation instances to relate to both the original person entity instance and the newly cloned entity instance. However, this would cause a cardinality violation as the many-to-one cardinality of the relationship type only permits it to refer to a single owner.

In general, a cardinality of 'many-to-one' or 'one-to-one' cannot be used in conjunction with a 'clone reverse setting' of 'clone by reference'. Similarly, a cardinality of 'one-to-many' or 'one-to-one' cannot be used in conjunction with a 'clone forward setting' of 'clone by reference'. A method 600 of cloning entity instances described below detects and disallows these logically invalid configurations.

Figure 6:
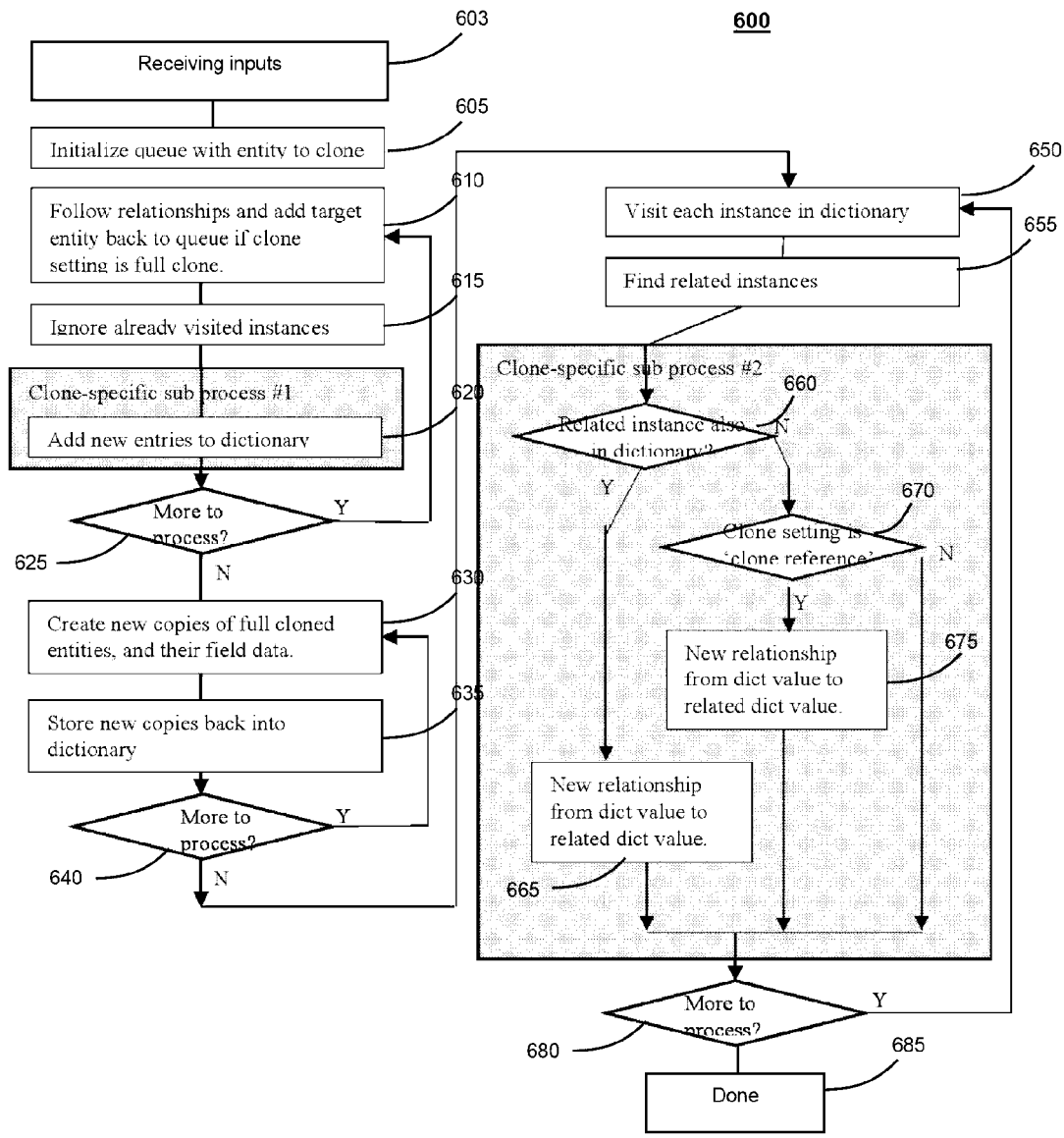
FIG. 6 shows a schematic flow diagram of a method of cloning entity instances.

FIG. 6 shows a schematic flow diagram of the method 600 of cloning entity instances. The method 600 follows a two-pass approach. That is, the method 600 operates by invoking the general mechanism described used in method 400 (FIG. 4C) twice, with a different sub-process required on each pass.

Method 600 starts in step 603 where the following are received as inputs: the entity-relationship database; the relationship type schema; two clone-specific sub-processes; and the particular entity instance on which the clone action is to commence.

The method 600 first, in steps 605 to 625, maps instances that will be fully cloned to their cloned instances. In step 605 an (initially empty) queue of entity instances to process is established, an (initially empty) dictionary mapping entity instances to clone instances is established, and the original entity being cloned received as input in step 603 is placed in the queue, as well as in the mapping dictionary (without a value).

In step 610 that follows, the next entity instance (or set of instances) is taken from the queue, and all relationship instances from that entity instance, along with the direction relative to the entity instance, are detected. Also in step 610, the relationship type is determined, together with the clone setting that is applicable for the direction for each relationship instance. Optionally the clone settings can be checked at this point to verify they are compatible with the cardinality of the relationship type.

Next, in step 615, any relationship instances that do not have the 'Full clone' setting are ignored.

Step 620 then determines the instances at the other end of the relationship for the relationship instances that correspond to a 'Full clone' setting. Any instances that are already present as keys in the mapping dictionary are ignored. The remaining instances are enqueued onto the queue of entities to be processed.

Step 625 the determined whether any instances remain in the queue to be processed. If instances remain in the queue, then processing returns to step 610.

If it is determined in step 625 that no further instances remain in the queue, then processing continues to steps 630 to 640 where cloned entity instances are created.

Step 630 determines the entity type for each entity in the mapping dictionary. Optionally, security checks may be performed to ensure the current security context has permission to create entities of the required type. Any entity data in the database is then cloned and corresponding field data for those cloned entities is copied.

Next, in step 635, the newly created cloned instance, or its ID, is stored into the mapping dictionary with the original entity as the key and the newly created entity as the value.

Step 640 then determines whether all entities in the mapping directory have been processed. If entities remain, the processing returns to step 630.

If it is determined in step 640 that all entries in the mapping directory have been processed, then processing continues to step 650 to 680 where the relationship structure is cloned.

In step 650, a next instance that is a key and value in the mapping dictionary is retrieved for processing. In step 655 all relationship instances from that key instance, along with their direction relative to the entity, are detected.

Step 660 then determines the entity at the other end of each relationship instance, and determines whether the entity at the other end is also a key in the mapping dictionary.

If it is determined in step 660 that the entity at the other end has a key in the mapping dictionary, a relationship is created in step 665, that created relationship being of the same type as that from the relationship instance of step 660, and pointing from the cloned instance of step 645 to the cloned instance (dictionary value) of step 660.

If it is determined in step 660 that the entity at the other end does not have a key in the mapping dictionary, then step 670 determines whether the relationship type has a clone setting of 'clone by reference'. If the clone setting is 'clone by reference', then in step 675 a new relationship is created of the same type as the relationship instance of step 660, and pointing from the cloned instance of step 645 to the entity at the other end of the relationship instance of step 660.

Following step 665 or step 675, or step 670 in the event that the clone setting is not 'clone by reference', step 680 then determines whether all entities in the mapping directory have been processed. If entities remain, the processing returns to step 650. Otherwise, the method 600 terminates in step 685.

As another example of entity graph cloning, consider a user interface screen, consisting of multiple elements, forms, reports and graphs. The various components of the user interface may all be represented as instances of various entity types. Some components of the user may be bound to other components of the user interface, for example so that clicking on a row in a report causes a detailed view of that row. The various components may also relate to various underlying data sources. The various composition of components on the user interface, and relationships between components, as well as links to external data sources, can all be represented as relationships.

By setting the appropriate clone settings metadata on each type of relationship, it is possible to clone an entire user interface screen without any additional coding other than the relationship configuration. Similarly, it is possible to clone just individual parts of the user interface, and move the cloned parts elsewhere on the user interface, with some internal components also being cloned as applicable (such as the columns of a report), while other parts of the structure point to the original entities (such as the data sources, or links to other controls).

Implicitly Including Data in Applications

The examples described above use relationship metadata for deleting and copying complex graphs entity/relationship data. The next example relates to the simple but important application allowing complex objects to be packaged together. The objects may be business data, or application elements themselves to describe the contents of an application.

In the present example a configuration setting is associated with the relationship type that indicates that, if one end of the entity is in a member of a package, then the entity at the other end of the relationship is also implicitly in the package. More particularly, a pair of settings 'forward implicit in package' and 'reverse implicit in package' having values of either true or false is provided associated with the relationship type.

If the 'forward implicit in package' setting is true on a relationship type, and there is an instance of that relationship type from entity instance A to entity instance B, and entity instance A is within the package (explicitly or implicitly itself), then entity instance B is also implicitly in the package. It is noted that the converse is no implicitly true.

If the 'reverse implicit in package' setting is true on a relationship type, and there is an instance of that relationship type from entity instance A to entity instance B, and entity instance B is within the package (explicitly or implicitly itself), then entity instance A is also implicitly in the package.

The package/application itself is modelled as an entity instance (with a corresponding entity type of 'application'). A relationship type of 'in application' is also provided from any type of entity to application. This provides for any entity to be explicitly designated as being in an application by establishing an instance of the 'in application' relationship between the entity in question and the entity that represents the application.

As with the other examples described above, allowance has to be made for the possibility that there may be cycles within the relationships between entities, preventing infinite loops.

Figure 7A:
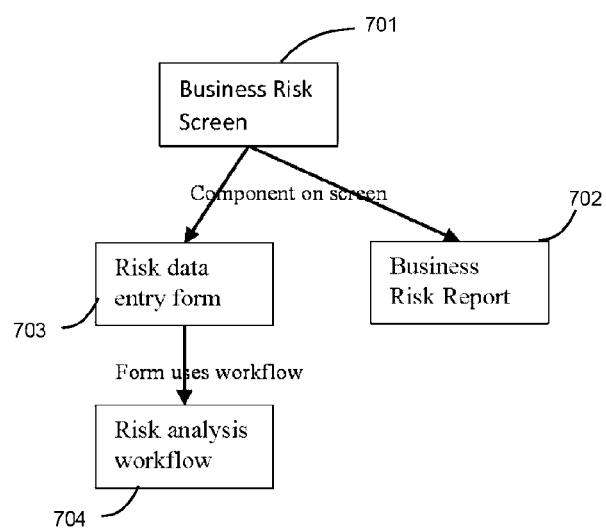
FIG. 7A shows an example graph of data representing several application components.

As an example, consider the graph of data representing several application components shown in FIG. 7A. A business risk user interface screen 701 is provided that contains a business risk report 702 and a risk data entry form 703. The risk data entry form 703 in turn runs a risk analysis workflow 704 when data is submitted.

In the present example the 'component on screen' relationship type and the 'form uses workflow' relationship type both have 'forward implicit in package' set to true. By detecting that the Business Risk Screen 701 is in the application package, then the risk data entry form 703, the business risk report 702, and the risk analysis workflow 704 also need to be placed in the application package.

Figure 7B:
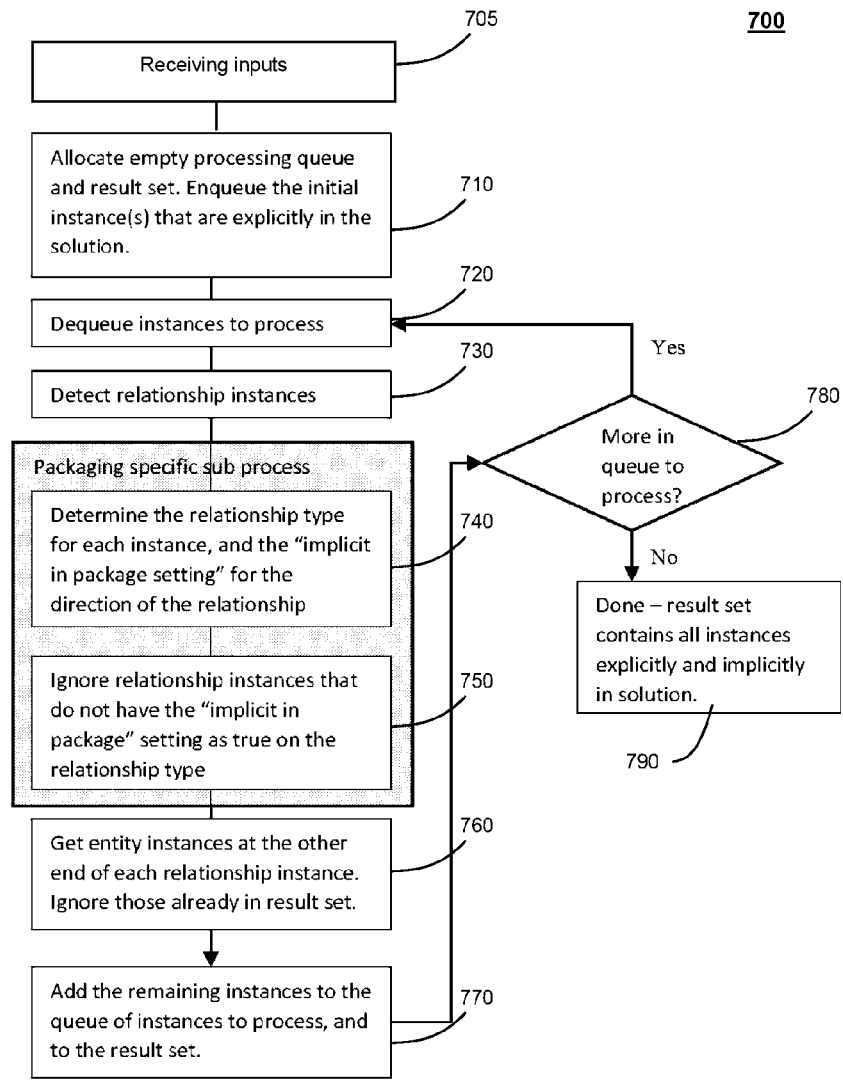
FIG. 7B shows a schematic flow diagram of a method of detecting that entities are implicitly in a package.

FIG. 7B shows a schematic flow diagram of a method 700 of detecting that entities are implicitly in a package. The method 700 starts in step 705 where the following are received as inputs: the entity-relationship database; the relationship type schema; a package-specific sub-process; and the set of instances that are explicitly in the application package.

The method 700 then proceeds to step 710 where an (initially empty) queue of entities to process is established. Also, an (initially empty) set of results is established. Finally, the original set of instances that are explicitly in the application package is placed into the queue of entities to process and also into the result set.

In step 720 a next instance (or set of instances) is dequeued to process. Next, in step 730 all relationship instances from the current instance being processed is detected, along with their direction relative to the entity instance being processed.

Step 740 follows where the relationship type, and its 'implicit in package' setting that is applicable for the direction for each relationship instance are determined. That is 'forward implicit in package' if the relationship instance has the current instance on its 'from' end, or 'reverse implicit in package' if the relationship instance has the current instance on its 'to' end. Any relationship instances that do not have this implicit in package setting set to true are ignored in step 750.

For the remaining relationship instances, the entity instance at the other end of the relationship instance is considered in step 760. If that entity instance is already in the result set then that entity instance is ignored. Otherwise, in step 770, the entity instance is added to the queue of instances to process.

Step 780 then determines whether entity instances remain in the queue for processing. If such entity instances remain, then processing returns to step 720. Alternatively, method 700 ends in step 790. The total set of instances that are explicitly or implicitly in the package are now contained in the result set.

Categorization of Relationship Types to Infer Metadata

As is described in detail above, in the schema additional metadata is associated with each relationship type. Combining the functionally of the three examples described above, the metadata designate the following for each relationship type:

The cascade delete setting, in both the forward and reverse directions;
The clone setting, in both the forward and reverse directions; and
The implicit in package setting, in both the forward and reverse directions.

It can become cumbersome to specify these six setting for each relationship type, especially in the case where many relationship types share common setting categorizations.

Four common categorizations were identified, those being:
1. Composition relationship types: Used to represent attaching subcomponents to some parent component. For example, the columns on a report, or the inputs on a form, or the activities in a workflow, and so on. The parent entity has a strong ownership over the child entity.

2. Dependency relationship types: Used to represent a scenario where entity B depends on entity A for meaningful existence, but is not logically a sub component of entity A. For example, a report template may depend on a data source, and be meaningless without that data source, but the report itself is not part of the data source.
3. Weak lookup relationship types: Weak relationships where one entity refers to another (and only one other), but does not depend on that entity. For example, a document may have a relationship to the user that created it, but the ongoing existence of the document is in no way contingent on the user account.
4. Many-to-many relationship types: In general, many to many relationships were found to never exhibit strong dependency properties because by definition that could be related to other entities at the same time. For example, security roles may relate to the reports that are granted permission by that role. Neither is contingent on the other.

It is noted that UML (Uniform Modelling Language) defines similar categorizations for relationships, which it refers to as associations. There is similarity between the UML categorizations and the categorizations identified above.

Provided herein is a way to specify the categorization for a relationship type. It then has a mapping table that indicates what specific metadata settings should apply for each relationship type of a given categorization. Any time a new relationship type is created or modified, other metadata settings that are associated with the application type are also updated.

A relationship type may also be set as a custom categorization. That is, it is possible to deviate from one of the above categorizations and instead specify every relationship type metadata setting individually.

Table 1 below lists the general relationship type categorizations, along with the metadata settings that are to be inferred from each relationship type. The inventors observed that relationships are often unintentionally created in the wrong direction, so in the implementation of the present disclosure, each of the following entries was duplicated with a corresponding entry having each setting and cardinality swapped.

TABLE 1

| Categorization | Meaning | Settings that are applied |
|---|---|---|
| Components | The 'To' entity is a component of the 'From' entity. | Cardinality = one-to-many<br>Cascade forward deletes = true<br>Cascade reverse deletes = false<br>Forward clone setting = full clone<br>Reverse clone setting = clone reference<br>Forward implicit in package = true<br>Reverse implicit in package = false |
| Single component | The 'To' entity is the exclusive component of the 'From' entity along this relationship. | Cardinality = one-to-one<br>Cascade forward deletes = true<br>Cascade reverse deletes = false<br>Forward clone setting = full clone<br>Reverse clone setting = do not clone<br>Forward implicit in package = true<br>Reverse implicit in package = false |
| Dependents | The 'To' entities depends on the 'From' entity. If the 'From' entity is deleted, then the 'To' entity must also be deleted. | Cardinality = one-to-many<br>Cascade forward deletes = true<br>Cascade reverse deletes = false<br>Forward clone setting = clone reference<br>Reverse clone setting = do not clone<br>Forward implicit in package = false<br>Reverse implicit in package = false |
| Shared dependents | The 'To' entries depends on there being at least one of the | Cardinality = many-to-many<br>Cascade forward deletes = true<br>Cascade reverse deletes = false<br>Forward clone setting = clone reference<br>Reverse clone setting = clone reference<br>Forward implicit in package = false<br>Reverse implicit in package = false |
| Weak lookup association | There is a many-to-one relationship from the entities of the From type to entities of the To type, but no dependency is inferred. | Cardinality = many-to-one<br>Cascade forward deletes = false<br>Cascade reverse deletes = false<br>Forward clone setting = clone reference<br>Reverse clone setting = do not clone<br>Forward implicit in package = false<br>Reverse implicit in package = false |
| Undirected many-to-many association | There is a many-to-many relationship from the entities of the From type to entities of the To type, but no dependency is inferred. | Cardinality = many-to-many<br>Cascade forward deletes = false<br>Cascade reverse deletes = false<br>Forward clone setting = clone reference<br>Reverse clone setting = clone reference<br>Forward implicit in package = false<br>Reverse implicit in package = false |
| Directed many-to-many association | The 'From' entity refers to multiple 'To' entities in a non-exclusive manner, but the 'To' entity is unaware of the relationship. | Cardinality = many-to-many<br>Cascade forward deletes = false<br>Cascade reverse deletes = false<br>Forward clone setting = clone reference<br>Reverse clone setting = drop<br>Forward implicit in package = false<br>Reverse implicit in package = false |

Other relationship categorizations may be defined.

Each of the generalized activity methods 300, 400, 600 and 700 described above, such as cloning, deleting, or packaging, etc., has a step that follows a relationship instance to its relationship type in order to determine the applicable settings. Using the categorizations above, those methods 300, 400, 600 and 700 are modified to instead examine the categorization of the relationship type, and if it is not 'custom' then to refer to the categorization table for the applicable setting.

An alternate implementation is that all settings are still maintained against each relationship type. However, whenever a relationship type is created, defined, imported, or modified, the complete set of rules is copied from the categorization settings table from the row that corresponds to the categorization into the settings for that relationship type. This additional overhead at the time of creation may allow for more efficient processing when the activities are invoked.

The foregoing describes only some embodiments of the present invention, and modifications and/or changes can be made thereto without departing from the scope and spirit of the invention, the embodiments being illustrative and not restrictive.

The invention claimed is:

1. A method of performing multiple types of actions of a graph-based activity on a graph subset of an entity-relationship database, the entity-relationship database having entity instances related by relationship instances, each relationship instance being associated with a relationship type, each relationship type having associated metadata, the metadata having a categorization that categorizes the relationship instance according to the association between the entity instances related by the relationship instance, wherein the categorization directs a manner in which the multiple types of actions functions, the method comprising the steps of:
  identifying an entity instance in the entity-relationship database upon which one of the types of actions is to be performed;
  performing the one of the types of actions on the identified entity instance;
  determining one or more entity instances related to the identified entity instance;
  for each determined entity instance, performing the sub-steps of:
    determining whether the entity instance has already been processed;
    in response to determining that the entity instance has already been processed, passing over the entity instance; and
    determining the relationship type of the relationship instance relating the determined entity instance to the identified entity instance; and
    determining, based upon the categorization of the metadata associated with the relationship type and the action to be performed, whether the action is to be performed on the determined entity instance; and
  repeating the method steps for each entity instance for which it is determined that the action is to be performed on that instance.

2. The method according to claim 1, wherein the types of actions include at least two of: a delete action, a clone action, and an implicit in package action.

3. The method according to claim 2, wherein the categorization comprises at least two of: components, single component, dependents, shared dependents, weak lookup association, undirected many-to-many association, and directed many-to-many association.

4. The method according to claim 3, wherein:
  the categorization of components causes the delete action to cascade delete in the forward direction only; and causes the clone action to perform a full clone in the forward direction and a reference-only clone in the reverse direction; and causes the implicit in package action to include entities in the package in the forward direction only;
  the categorization of single component causes the delete action to cascade delete in the forward direction only; and causes the clone action to perform a full clone in the forward direction only; and causes the implicit in package action to include entities in the package in the forward direction only;
  the categorization of dependents causes the delete action to cascade delete in the forward direction only; and causes the clone action to perform a reference-only clone in the forward direction only; and causes the implicit in package action to not treat the related entity as being implicitly in the package;
  the categorization of shared dependents causes the delete action to cascade delete in the forward direction only; and causes the clone action to perform a reference-only clone in both the forward and reverse direction; and causes the implicit in package action to not treat the related entity as being implicitly in the package;
  the categorization of weak lookup association causes the delete action to ignore the relationship; and causes the clone action to perform a reference-only clone in the forward direction only; and causes the implicit in package action to not treat the related entity as being implicitly in the package;
  the categorization of undirected many-to-many association causes the delete action to ignore the relationship; and causes the clone action to perform a reference-only clone in both directions; and causes the include in package action to not treat the related entity as being implicitly in the package; and
  the categorization of directed many-to-many association causes the delete action to ignore the relationship; and causes the clone action to perform a reference-only clone in the forward direction only; and causes the implicit in package action to not treat the related entity as being implicitly in the package.

5. An apparatus for performing multiple types of actions of a graph-based activity on a graph subset of an entity-relationship database, the entity-relationship database having entity instances related by relationship instances, each relationship instance being associated with a relationship type, each relationship type having associated metadata, the metadata having a categorization that categorizes the relationship instance according to the association between the entity instances related by the relationship instance, wherein the categorization directs a manner in which the multiple types of actions functions, the apparatus comprising processing means for performing the steps of:
  identifying an entity instance in the entity-relationship database upon which one of the types of actions is to be performed;
  performing the one of the types of actions on the determined entity instance;
  determining one or more entity instances related to the identified entity instance;

for each determined entity instance, performing the sub-steps of:
  determining whether the entity instance has already been processed;
  in response to determining that the entity instance has already been processed, passing over the entity instance; and
  determining the relationship type of the relationship instance relating the determined entity instance to the identified entity instance; and
  determining, based upon the categorization of the metadata associated with the relationship type and the action to be performed, whether the action is to be performed on the determined entity instance; and
repeating the steps for each entity instance for which it is determined that the action is to be performed on that instance.

6. The apparatus according to of claim 5, wherein the processing means includes at least one processor unit communicating with a memory unit.

7. The apparatus according to claim 5, wherein the types of actions include least two of: a delete action, a clone action, and an implicit in package action.

8. The apparatus according to claim 5, wherein the categorization comprises at least two of: components, single component, dependents, shared dependents, weak lookup association, undirected many-to-many association, and directed many-to-many association.

9. The apparatus according to claim 8, wherein:
the categorization of components causes the delete action to cascade delete in the forward direction only; and causes the clone action to perform a full clone in the forward direction and a reference-only clone in the reverse direction; and causes the implicit in package action to include entities in the package in the forward direction only;
the categorization of single component causes the delete action to cascade delete in the forward direction only; and causes the clone action to perform a full clone in the forward direction only; and causes the implicit in package action to include entities in the package in the forward direction only;
the categorization of dependents causes the delete action to cascade delete in the forward direction only; and causes the clone action to perform a reference-only clone in the forward direction only; and causes the implicit in package action to not treat the related entity as being implicitly in the package;
the categorization of shared dependents causes the delete action to cascade delete in the forward direction only; and causes the clone action to perform a reference-only clone in both the forward and reverse direction; and causes the implicit in package action to not treat the related entity as being implicitly in the package;
the categorization of weak lookup association causes the delete action to ignore the relationship; and causes the clone action to perform a reference-only clone in the forward direction only; and causes the implicit in package action to not treat the related entity as being implicitly in the package;
the categorization of undirected many-to-many association causes the delete action to ignore the relationship; and causes the clone action to perform a reference-only clone in both directions; and causes the include in package action to not treat the related entity as being implicitly in the package; and
the categorization of directed many-to-many association causes the delete action to ignore the relationship; and causes the clone action to perform a reference-only clone in the forward direction only; and causes the implicit in package action to not treat the related entity as being implicitly in the package.

10. An apparatus comprising:
a processor; and
a non-transitory computer-readable storage medium storing a program to be executed by the processor, the program including instructions for performing multiple types of actions of a graph-based activity on a graph subset of an entity-relationship database, the entity-relationship database having entity instances related by relationship instances, each relationship instance being associated with a relationship type, each relationship type having associated metadata, the metadata having a categorization that categorizes the relationship instance according to the association between the entity instances related by the relationship instance, wherein the categorization directs a manner in which the multiple types of actions functions, the instructions including instructions for:
  identifying an entity instance in the entity-relationship database upon which one of the types of actions is to be performed;
  performing the one of the types of actions on the determined entity instance;
  determining one or more entity instances related to the identified entity instance;
  for each determined entity instance, performing the sub-steps of:
    determining whether the entity instance has already been processed;
    in response to determining that the entity instance has already been processed, passing over the entity instance; and
    determining the relationship type of the relationship instance relating the determined entity instance to the identified entity instance; and
    determining, based upon the categorization of the metadata associated with the relationship type and the action to be performed, whether the action is to be performed on the determined entity instance; and
  repeating the steps for each entity instance for which it is determined that the action is to be performed on that instance.

11. The apparatus according to claim 10, wherein the categorization comprises at least two of: components, single component, dependents, shared dependents, weak lookup association, undirected many-to-many association, and directed many-to-many association.

12. The apparatus according to claim 11, wherein:
the categorization of components causes the delete action to cascade delete in the forward direction only; and causes the clone action to perform a full clone in the forward direction and a reference-only clone in the reverse direction; and causes the implicit in package action to include entities in the package in the forward direction only;
the categorization of single component causes the delete action to cascade delete in the forward direction only; and causes the clone action to perform a full clone in the forward direction only; and causes the implicit in package action to include entities in the package in the forward direction only;

the categorization of dependents causes the delete action to cascade delete in the forward direction only; and causes the clone action to perform a reference-only clone in the forward direction only; and causes the implicit in package action to not treat the related entity as being implicitly in the package;

the categorization of shared dependents causes the delete action to cascade delete in the forward direction only; and causes the clone action to perform a reference-only clone in both the forward and reverse direction; and causes the implicit in package action to not treat the related entity as being implicitly in the package;

the categorization of weak lookup association causes the delete action to ignore the relationship; and causes the clone action to perform a reference-only clone in the forward direction only; and causes the implicit in package action to not treat the related entity as being implicitly in the package;

the categorization of undirected many-to-many association causes the delete action to ignore the relationship; and causes the clone action to perform a reference-only clone in both directions; and causes the include in package action to not treat the related entity as being implicitly in the package; and the categorization of directed many-to-many association causes the delete action to ignore the relationship; and causes the clone action to perform a reference-only clone in the forward direction only; and causes the implicit in package action to not treat the related entity as being implicitly in the package.

* * * * *